United States Patent [19]

Rowland-Hill et al.

[11] Patent Number: 4,535,788

[45] Date of Patent: Aug. 20, 1985

[54] LATERAL LEVELING MECHANISM FOR COMBINE CLEANING APPARATUS

[75] Inventors: E. William Rowland-Hill; Ronald T. Sheehan, both of Lancaster, Pa.

[73] Assignee: Sperry Corporation, New Holland, Pa.

[21] Appl. No.: 659,932

[22] Filed: Oct. 11, 1984

[51] Int. Cl.³ .............................................. A01F 12/32
[52] U.S. Cl. ................................. 130/27 AE; 130/24; 56/10.2; 56/DIG. 15; 56/209; 209/416
[58] Field of Search ................ 56/10.2, 209, 210, 212, 56/214, 217, DIG. 5, DIG. 10, DIG. 15; 130/27 AE, 24, 25, 27 Z, 27 R; 209/416

[56] References Cited

U.S. PATENT DOCUMENTS

| | | | |
|---|---|---|---|
| 2,691,444 | 10/1954 | Oliver | 130/27 AE |
| 3,269,685 | 8/1966 | Wallace | 56/210 |
| 4,344,443 | 8/1982 | DeBusscher et al. | 130/27 Z |
| 4,355,647 | 10/1982 | Heidjann et al. | 56/209 |

FOREIGN PATENT DOCUMENTS 1313802 4/1973 United Kingdom .

Primary Examiner—Gene Mancene
Assistant Examiner—John G. Weiss
Attorney, Agent, or Firm—Larry W. Miller; Frank A. Seemar; Darrell F. Marquette

[57] ABSTRACT

A cleaning apparatus for a combine harvester is disclosed wherein the grain pan and chaffer sieve are mounted in a subframe pivotally supported by a shaker shoe for a laterally tilting movement about a fore-and-aft extending axis. The shaker shoe is connected to an eccentric drive to effect a generally fore-and-aft shaking action to convey threshed grain thereon in a rearward direction. The pivotal movement of the subframe relative to the shaker shoe is accomplished through the use of a hydraulic cylinder interconnecting the shaker shoe and the subframe to permit a lateral leveling of the grain pan and chaffer sieve when the combine is operated under sidehill conditions. An inclinometer is utilized to control the flow of hydraulic fluid to the hydraulic cylinder to permit the subframe to be leveled in response to a sensing of a non-horizontal transverse inclination by the inclinometer.

13 Claims, 6 Drawing Figures

4,535,788

LATERAL LEVELING MECHANISM FOR COMBINE CLEANING APPARATUS

BACKGROUND OF THE INVENTION

The present invention relates generally to combine harvesters and, more particularly, to improvements in the cleaning apparatus to permit a leveling thereof under sidehill conditions.

The operation of combine harvesters under sidehill conditions, i.e., a lateral inclination of the combine in a non-horizontal position, is less efficient than the operation of the combine operating on generally level ground because of the gravity induced movement of threshed grain to the downhill side of the cleaning apparatus. This unbalanced loading of the cleaning mechanism prevents a proper flow of air from a cleaning fan through the threshed grain to facilitate the removal of chaff and other debris.

This unbalanced lateral distribution of material across the cleaning mechanism reduces or eliminates the aerodynamic separtaion and cleaning of the threshed grain by the flow of air through the sieves. As a result, the cleaning mechanism delivers a greater amount of uncleaned grain to the returns system for reprocessing and also discharged out the rear of the combine to be lost from the harvesting process. One known method of eliminating this problem is to reduce crop intake; however, operating efficiency of the combine is correspndingly reduced which is not desirable.

One attempt to maintain a combine cleaning apparatus in a horizontal orientation while the combine is operating under sidehill conditions is found in U.S. Pat. No. 3,731,470. With this particular apparatus, the entire frame of the combine is leveled through the operation of hydraulic cylinders, requiring a modified connection of the crop harvesting header to the combine to permit a proper gathering of the crop material to be harvested. Another cleaning apparatus leveling mechanism can be seen in U.S. Pat. No. 4,344,443, which provides that the entire cleaning mechanism, including the fan, is pivotally mounted for movement relative to the main frame about a longitudinally extending pivotal axis. However, this particular mechanism is expensive to manufacture, is cumbersome in operation, results in an unnecessary shifting of major structural components and requires a more complex main frame structure and drive train components.

SUMMARY OF THE INVENTION

It is an object of this invention to overcome the aformentioned disadvantages of the prior art by providing a lateral leveling mechanism for the cleaning apparatus in a combine harvester having a subframe mounting a grain pan and a chaffer sieve for pivotal movement relative to a shaker shoe.

It is another object of this invention to provide a mechanism for leveling the cleaning apparatus in a combine harvester that only levels the grain pan and chaffer sieve.

It is an advantage of this invention that the efficiency of operation of the combine cleaning mechanism is increased under sidehill operating conditions.

It is a feature of this invention that a shaker shoe pivotally supporting a subframe mounting the grain pan and chaffer sieve is connected to an eccentric drive to affect a generally fore-and-aft shaking action to convey grain thereon in a rearward direction and facilitate the cleaning of threshed grain on the chaffer sieve.

It is another feature of this invention that a lower sieve can be operatively connected to the shaker shoe to affect a fore-and-aft reciprocating movement in opposition to the shaker shoe.

It is another advantage of this invention that the weight of the structural elements pivotally supported for movement about a longitudinally extending axis is reduced, permitting an improved leveling operation.

It is still another feature of this invention that the fan and supporting structural components are not pivotally supported for lateral tilting movement.

It is still another object of this invention to control the leveling operation of the cleaning mechanism automatically without the need for operator input.

It is yet another feature of this invention that the cleaning apparatus leveling mechanism is operatively connected to an inclinometer for automatically controlling the leveling movement in response to a sensing of a lateral iclination of the main frame.

It is still another advantage of this invention that the grain losses and returns flow are diminished.

It is yet another object of this invention to provide a leveling mechanism for a combine cleaning apparatus without requiring complex main frame structure and drive train components.

It is a further object of this invention to provide a lateral leveling mechanism for the cleaning apparatus of a combine harvester which is durable in construction, inexpensive of manufacture, carefree of maintenance, facile in assemblage, and simple and effective in use.

These and other objects, features and advantages are accomplished according to the instant invention by providing a cleaning apparatus for a combine harvester wherein the grain pan and chaffer sieve are mounted in a subframe pivotally supported by a shaker shoe for a laterally tilting movement about a fore-and-aft extending axis. The shaker shoe is connected to an eccentric drive to effect a generally fore-and-aft shaking action to convey threshed grain thereon in a rearward direction. The pivotal movement of the subframe relative to the shaker shoe is accomplished through the use of a hydraulic cylinder interconnecting the shaker shoe and the subframe to permit a lateral leveling of the grain pan and chaffer sieve when the combine is operated under sidehill conditions. An inclinometer is utilized to control the flow of hydraulic fluid to the hydraulic cylinder to permit the subframe to be leveled in response to a sensing of a non-horizontal transverse inclination by the inclinometer.

BRIEF DESCRIPTION OF THE DRAWINGS

The advantages of this invention will become apparent upon consideration of the following detailed description of the invention, especially when taken in conjunction with the accompanying drawings wherein.

DETAILED DESCRIPTION OF THE PREFERRED EMBODIMENT

Figure 1:
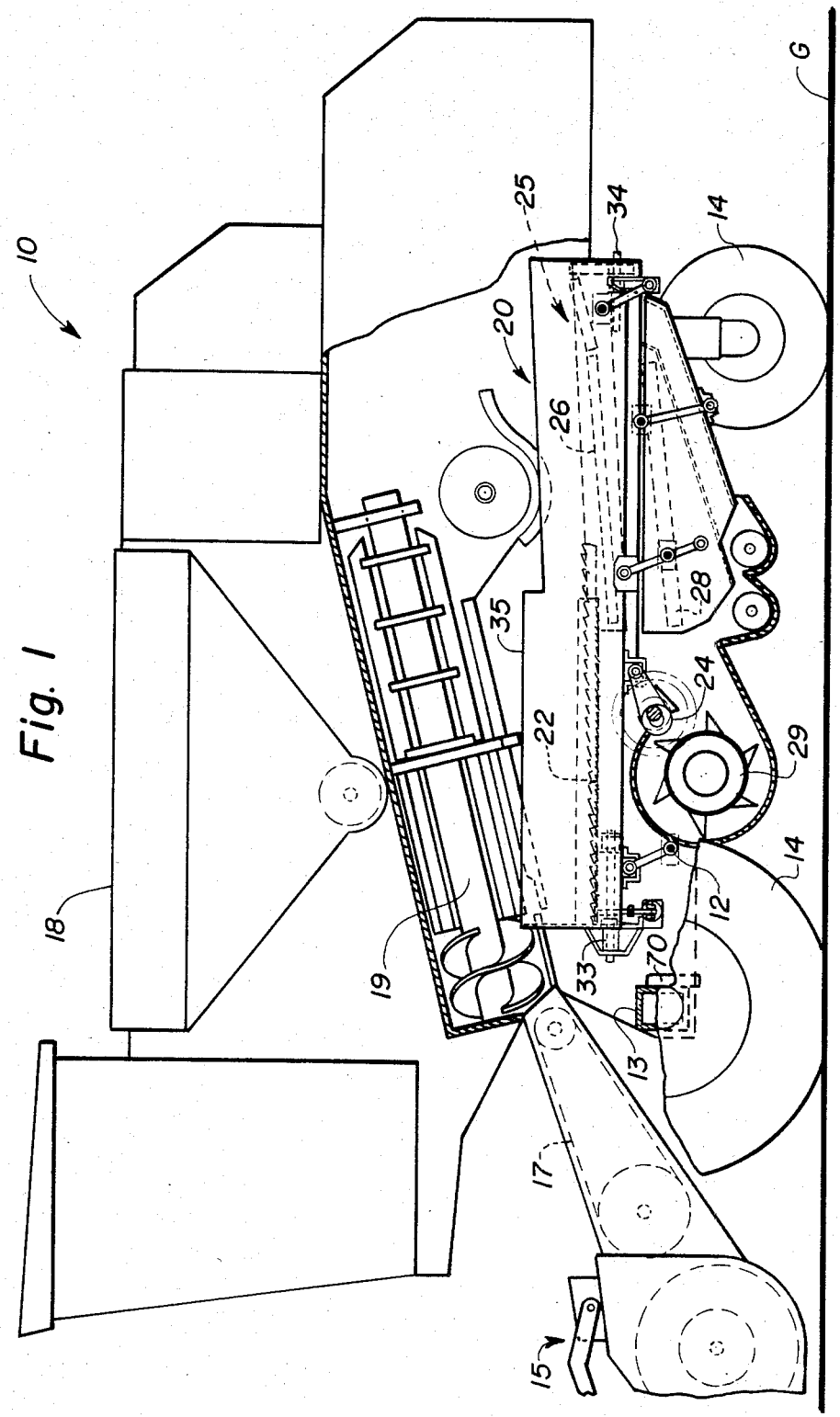
FIG. 1 is a side elevational view of a combine harvester incorporating the principles of the instant invention, portions of the side structure of the harvester being broken away to better show the invention.

Referring now to the drawings and, particularly, to FIG. 1, a side elevational view of a combine harvester incorporating the principles of the instant invention, can be seen. Any left and right references are used as a matter of convenience and are determined by standing at the rear of the machine, facing the forward end, the direction of travel. The combine 10 is provided with a main frame 12 having at least one transversely disposed beam 13 mobilely supported over the ground G by wheels 14. A crop harvesting header 15 is forwardly supported from the frame 12 to gather crop material and convey it rearwardly via a feeding mechanism 17 to a threshed and separating mechanism 19. The threshing and separating mechanism 19 is operable to thresh the crop material fed thereto and separate the threshed grain from the trash material to precipitate the threshed grain downwardly through the threshing and separating mechanism 19 and to discharge the trash material along a separate path to be deposited on the ground G rearward of the combine 10.

A cleaning mechanism 20 is positioned beneath the threshing and separating mechanism 19 to receive the threshed grain precipitated therefrom on a grain pan 22. Generally, the cleaning mechanism 20 is operatively connected to an eccentric drive 24 to affect a generally fore-and-aft reciprocating movement of the cleaning mechanism 20 to convey the thresh grain in a rearward direction. A sieve means 25 is positioned rearwardly of the grain pan 22 to receive threshold grain conveyed rearwardly therefrom and clean the threshed grain from chaff and other debris conveyed therewith. Typically, the sieve means 25 includes an upper chaffer sieve 26 and a lower cleaning sieve mounted for opposing fore-and-aft reciprocating movement and in flow communication with air being blown from a fan 29 upwardly through the sieves 26,28 to remove chaff and debris from the threshed grain. Cleaned grain passing through the sieve means 25 is conveyed into a storage tank 18 supported on the main frame 12.

Figure 2:
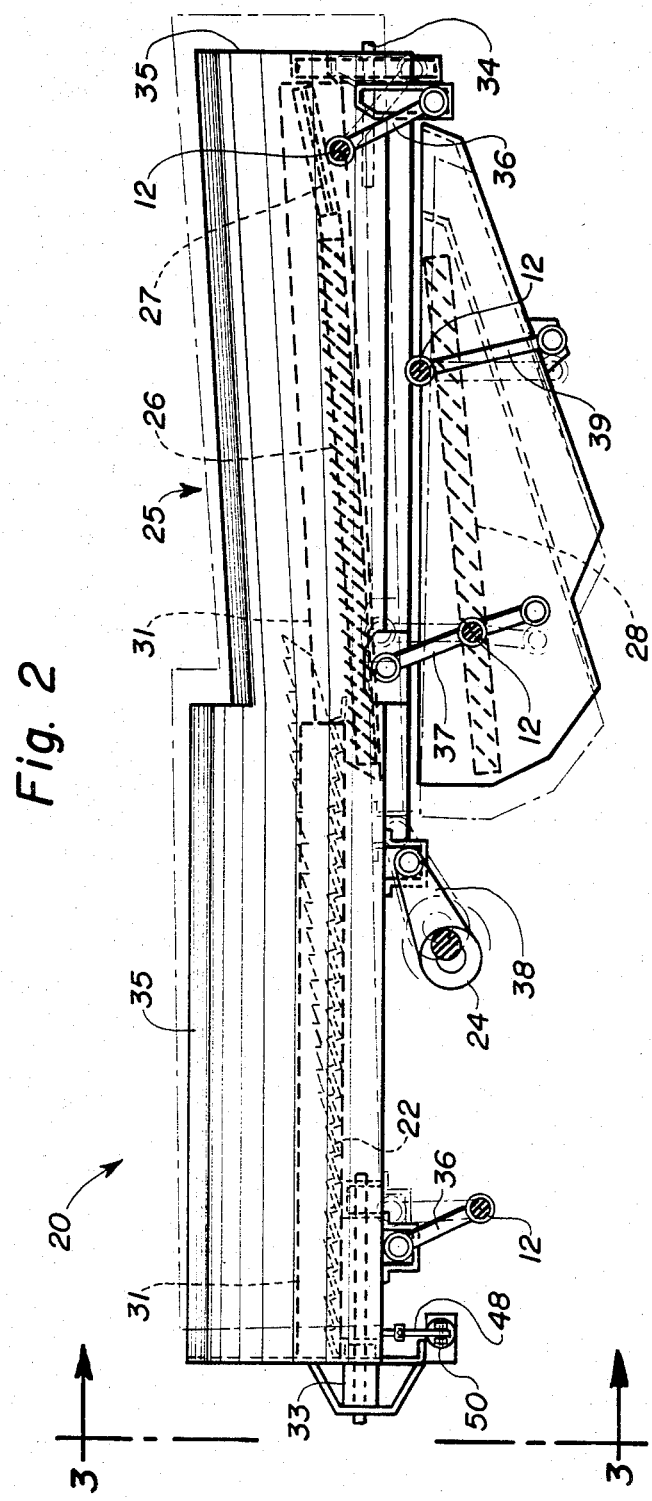
FIG. 2 is an enlarged partial cross sectional view of the cleaning apparatus seen in FIG. 1, the generally fore-and-aft reciprocating movement of the shaker shoe and lower sieve being shown in phantom.
Figure 3:
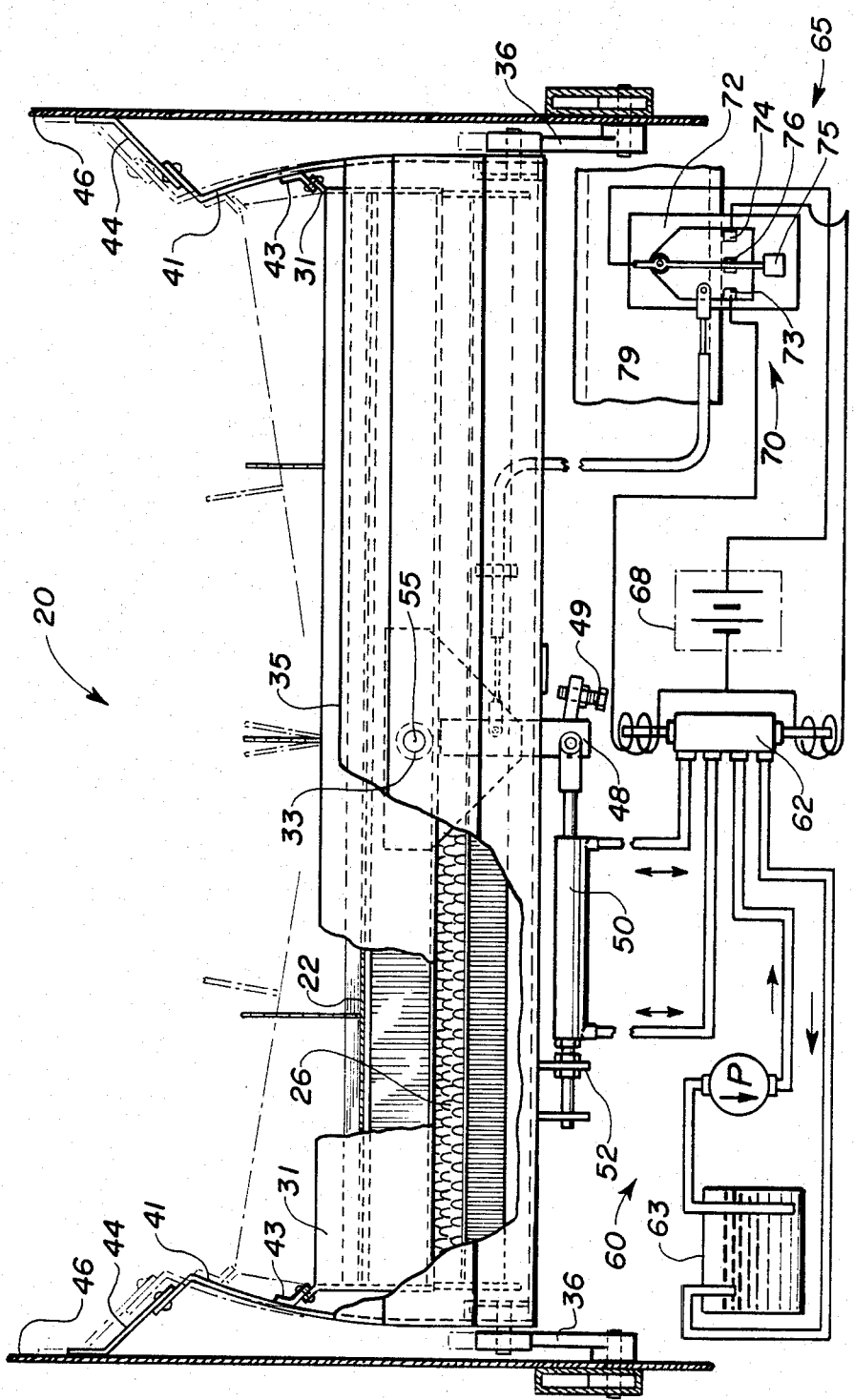
FIG. 3 is a partial cross sectional end view of the cleaning apparatus shown in FIG. 2 seen in the direction indicated by lines 3—3, the pivotal movement of the subframe containing the grain pan and chaffer sieve being shown in phantom, the hydraulic and electrical diagrams for controlling the operation of the hydraulic cylinder tilting the subframe being schematically shown beneath the cleaning apparatus.

Referring now to FIGS. 2 and 3, the details of the leveling mechanism comprising the instant invention can best be seen. The grain pan 22 and chaffer sieve 26 are mounted in a subframe 31 which in turn is pivotally supported by fore-and-aft extending and longitudinally spaced pivots 33,34 within a shaker shoe 35. A tailings return section 27 is positioned at the rear of the chaffer sieve 26 and is pivotally movable therewith. The tailings return section 27 is cooperable with conventional appratus for the return of unthreshed heads to the threshing and separating means 19. The shaker shoe 35 is pivotally supported from the frame 12 by connecting links 36,37 incorporating rubber bushings in a conventional manner to permit a fore-and-aft reciprocating movement induced by a drive arm 38 interconnecting the shaker shoe 35 and the eccentric drive 24. The lower cleaning sieve 28 is supported from the frame 12 by connecting links 37,39 in a similar manner to permit a fore-and-aft reciprocating movement. By utilizing the center connecting link 37 with a frame mounting point intermediate the connection between the shaker shoe 35 and the lower cleaner sieve 28, the shaker shoe 35 and lower sieve 28 are drivingly reciprocating in opposing fore-and-aft directions in a manner conventionally known by one skilled in the art.

The shaker shoe 35 is provided with inwardly directed arcuate side members 41 to permit a sealing cooperation with longitudinally extending seals 43 connected to the subframe 31 and sweepingly engaging the inside of the arcuate side members 41. Although the shaker shoe 35 is not laterally pivotable relative to the main frame 12, the shaker shoe 35 does reciprocate in the aforementioned fore-and-aft direction relative to the main frame 12. Seals 44 connected to the shaker shoe 35 engage the side sheets 46 of the combine 10 to prevent the loss of threshed grain between the shaker shoe 35 and side sheets 46.

The subframe 31 is provided with a downwardly extending actuating arm 48. A hydraulic cylinder 50 interconnects a mounting tab 52 connected to the shaker shoe 35 and the actuating arm 48 for the pivotal movement of the subframe 31 about the fore-and-aft extending pivot axis 55 defined by the front and back pivots 33,34. An adjustable stop bolt 49 engageable with the shaker shoe 35 serves as a limit to the amount of pivotal movement permited the subframe 32 in one direction, while the end of the retraction stroke of the cylinder 50 limits the movement of the subframe 31 in the opposing direction. The hydraulic cylinder 50 is operatively associated with a hydraulic system 60 providing a flow of hydraulic fluid under pressure for operation thereof. The hydraulic system 60 includes a solenoid valve 62 controlling the direction of hydraulic fluid flow to the cylinder 50. The solenoid valve 62 can be positioned to direct fluid to the cylinder 50 for either extension or retraction thereof or to circulate fluid back to the reservoir 63 without affecting any movement of the hydraulic cylinder 50.

The positioning of the solenoid valve 62 is controlled through an electrical circuit 65 connected to an inclinometer 70. The inclinometer 70 includes a master member 72 having first and second spaced apart electrical contacts 73,74, respectively, and a pendulum 75 pivotally mounted within the master member 72 for movement with the force of gravity relative to the master member 72. The pendulum 75 carries a third electrical contact 76 engageable with the first and second contacts 73,74 to close the electrical circuit 65 and send a flow of electrical current from a primary source, such as a battery 68, to the solenoid valve 62. The position of the master member 72 relative to the transverse beam 13 is controlled through a link 79 interconnecting the actuating arm 48 and the master member 72. A lateral tilting of the subframe 31 relative to the shaker shoe 35 affects a corresponding movement of the master member 72 relative to the transverse beam 13 and the pendulum 75. One skilled in the art will readily realize that other means for sensing the transverse inclination of the main frame 12 in place of the inclinometer 70 described above could be provided to equally control the operation of the solenoid valve 62, such as the utilization of mercury switches or hall effect switches. Another modification to the inclinometer 70, described above, would be to dampen the movement of the pendulum 75 in an oil bath.

Figure 4:
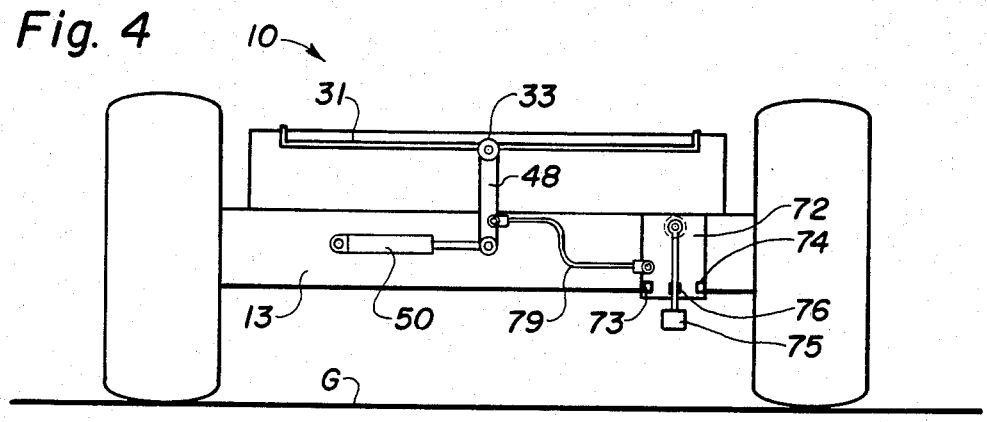
FIGS. 4-6 are schematic views depicting the operation of the lateral leveling mechanism for the combine cleaning apparatus.
Figure 5:
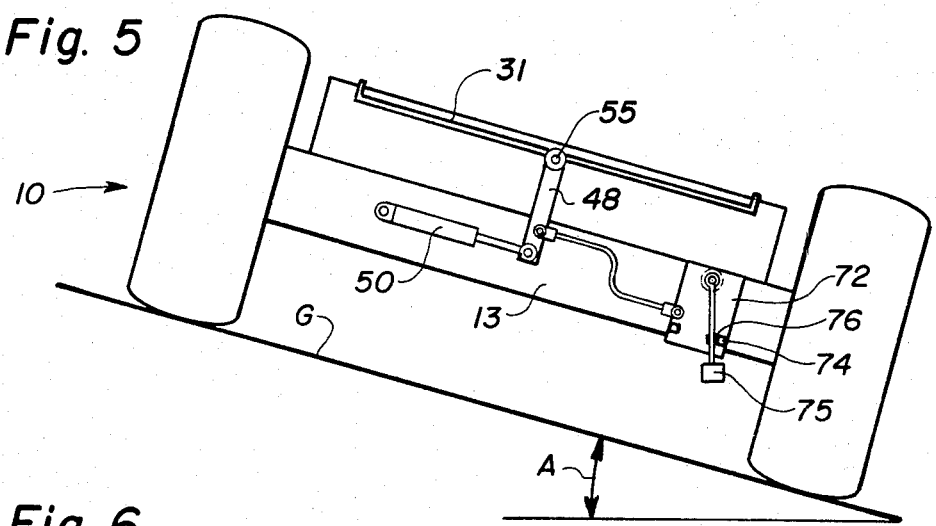
Figure 6:
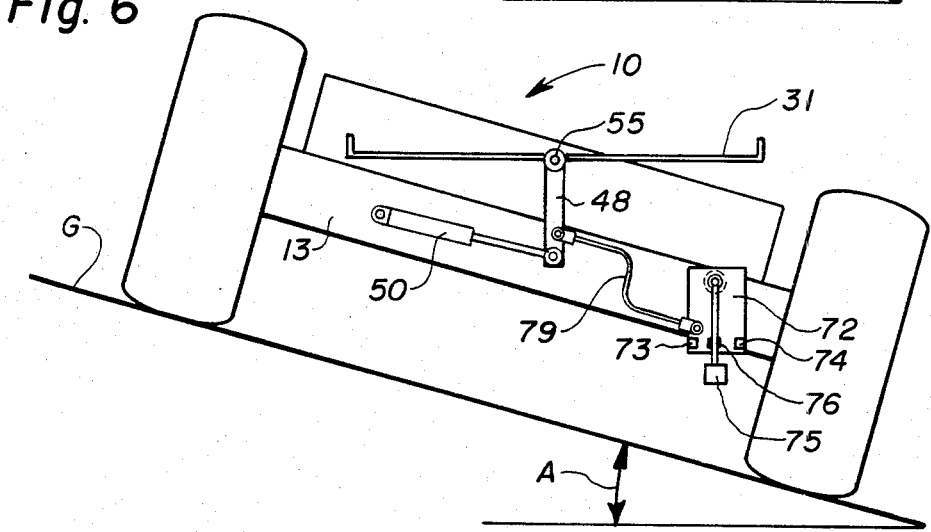

Referring to the schematic view seen in FIGS. 4-6, and the structural components best referenced in FIG. 3, the operation of the lateral leveling mechanism can best be seen. In FIG. 4, the combine 10 is shown operating on level ground G with the subframe 31 of the cleaning mechanism 20 in a horizontal orientation and the pendulum 75 positioned with the third contact 76 spaced intermediate of the first and second contacts 73,74. A shifting of the transverse orientation of the combine 10 onto a sidehill operation depicted by an inclination of the ground G in FIG. 5 at an angle A relative to horizontal with the leftwheel being lower than the right wheel, causes a relative movement between the pendulum 75 and the master member 72. Since the movement of the pendulum 75 is influenced by the force of gravity, the movement of the master member 72 with the transverse beam 13 causes the second and third contacts 74,76 to engage.

The subsequent flow of electrical current from the battery 68 through the electrical circuit 65 causes a shifting of the solenoid valve 62 to direct hydraulic fluid through the hydraulic cylinder 50 to affect an extension of the cylinder 50, the result being a pivotal movement of the subframe 31 about the pivot axis 55. The corresponding movement of the actuating arm 48 pushes the master member 72 until the second and third contacts 74,76 break engagement and, therefore, break the electrical circuit 65, permitting the solenoid valve 62 to shift back into a neutral position causing a circulating of hydraulic fluid without affecting further movement of the hydraulic cylinder 50. As represented in FIG. 6, the result is that the cleaning mechanism 20 is positioned in a horizontal orientation while the transverse beam 13 is inclined at angle A in a sidehill operation.

A return of the combine 10 to level ground G or the positioning of the combine 10 in a transverse inclination with the right wheel being lower than the left wheel, is similar to the operation described relative to FIGS. 4-6 above. The relative movement between the pendulum 75 and the master member 72 would affect an engagement between the first and third contacts 73,76 causing a shifting of the solenoid valve 62 to affect a flow of hydraulic fluid to the hydraulic cylinder 50 to cause a retraction thereof and pivot the subframe 31 about the pivot axis 55 until the master member 72 is moved sufficiently relative to the pendulum 75 to break the engagement between the first contact 73 and the third contact 76.

It will be understood that changes in the details, materials, steps and arrangements of parts which have been described and illustrated to explain the nature of the invention will occur and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a combine harvester having a mobile frame; threshing and separating means supported by said main frame to thresh crop material fed thereto for separating threshed grain from trash residue, said threshing and separating means being operable to convey threshed grain for further harvesting treatment and to discharge the crop residue along a path separate from said threshed grain; cleaning means supported by said main frame in flow communication with said threshing and separating means to receive threshed grain therefrom and to clean debris from said threshed grain, said cleaning means having first sieve means to permit the passage of cleaned grain therethrough, a fan operable to blow air through said first sieve means to facilitate the removal of debris from said threshed grain, a grain pan for receiving threshed grain from said threshing and separating means, and conveying means to convey said threshed grain from said grain pan to said first sieve means; and drive means for powering the operation of said threshing and separating means and said cleaning means, the improvement comprising:

a subframe supported on said main frame for movement about a generally fore-and-aft extending axis such that said subframe can be tilted in a transverse direction relative to said main frame, said subframe mounting said grain pan and said first sieve means for lateral pivotal movement relative to said main frame without affecting movement of said fan relative to said main frame;

an actuator operably associated with said subframe for selectively controlling the pivotal movement of said subframe to permit said grain pan and said first sieve means to be maintained in a transversely level attitude relative to the ground irrespective of the transverse attitude of said main frame; and control means operable to sense the transverse inclination of said main frame and control the subsequent operation of said actuator to maintain a transversely level attitude of said actuator to maintain a transversely level attitude of said subframe, said control means including an inclinometer mounted on a transversely extending portion of said main frame and having a first contact member movable in response to gravitational forces when said main frame is laterally inclined and a second contact member movable in response to movements of said subframe.

2. The combine harvester of claim 1 wherein said control means includes a link interconnecting said subframe and said second contact member to effect a movement of said second contact member in response to a corresponding movement of said subframe.

3. The combine harvester of claim 2 wherein said actuator is a hydraulic cylinder operably powered by a hydraulic system having a solenoid valve operably connected to said inclinometer, a flow of electrical current between said first and second contact members when engaged effecting the actuation of said solenoid valve to control the flow of hydraulic fluid to said hydraulic cylinder.

4. The combine harvester of claim 3 wherein said second contact member has first and second contacts, the respective engagement between said first contact member and said first and second contacts of said second contact member effecting the movement of said subframe in opposing directions.

5. The combine harvester of claim 1 wherein said conveying means includes a shaker shoe connected to said subframe, said drive means being operably connected to said shaker shoe to effect a generally fore-and-aft reciprocating movement of said grain pan and said first sieve means to convey threshed grain thereon in a rearward direction.

6. The combine harvester of claim 5 wherein said subframe is pivotally mounted on said shaker shoe such that said subframe is laterally tiltable relative to said shaker shoe.

7. The combine harvester of claim 6 further comprising a second sieve means suspended from said shaker shoe below said first sieve means to receive cleaned grain passing through said first sieve means and subject said cleaned grain to further cleaning action.

8. The combine harvester of claim 7 wherein said second sieve means is operably connected to said drive means for a generally fore-and-aft movement in opposition to said shaker shoe.

9. The combine harvester of claim 6 wherein said actuator includes a hydraulic cylinder interconnecting said shaker shoe and said subframe.

10. The combine harvester of claim 9 wherein said first sieve means includes a tailings return section at the rearward end thereof.

11. The combine harvester of claim 6 wherein said shaker shoe has arcuate sidewalls to correspond to the pivotal movement of said subframe.

12. The combine harvester of claim 11 wherein said subframe includes fore-and-aft extending seals engageable with said arcuate sidewalls of said shaker shoe to prevent the loss of threshed grain therebetween.

13. The combine harvester of claim 12 wherein said shaker shoe is provided with longitudinally extending seals engageable with sidewalls of said combine harvester to prevent the loss of threshed grain between said shaker shoe and said sidewalls during the reciprocating movement of said shaker shoe.

* * * * *